US008125695B2

(12) United States Patent
Spears

(10) Patent No.: US 8,125,695 B2
(45) Date of Patent: Feb. 28, 2012

(54) IMAGING SYSTEM AND METHOD

(75) Inventor: Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2820 days.

(21) Appl. No.: 10/395,346

(22) Filed: Mar. 24, 2003

(65) Prior Publication Data

US 2004/0190090 A1  Sep. 30, 2004

(51) Int. Cl.
*H04N 1/46* (2006.01)
(52) U.S. Cl. ........ 358/514; 358/513; 358/482; 358/504; 382/151; 382/312; 348/311; 348/298
(58) Field of Classification Search ................... 358/474, 358/468, 514, 513, 505, 208.1, 497, 496, 358/445, 461, 482, 466, 512; 250/208.1; 348/311, 298, 333.01, 207.99, 255; 382/148, 382/312
See application file for complete search history.

(56) References Cited

U.S. PATENT DOCUMENTS

| | | | | |
|---|---|---|---|---|
| 4,069,501 A * | 1/1978 | Yamanaka | ................ | 348/264 |
| 4,146,786 A * | 3/1979 | Agulnek | ................ | 250/235 |
| 4,148,579 A * | 4/1979 | Axelrod et al. | ................ | 355/41 |
| 4,567,527 A * | 1/1986 | Yokomizo | ................ | 358/461 |
| 4,567,537 A * | 1/1986 | Kalkhof et al. | ................ | 361/18 |
| 4,675,745 A * | 6/1987 | Suzuki | ................ | 358/483 |
| 4,691,114 A * | 9/1987 | Hasegawa et al. | ................ | 358/474 |
| 4,691,237 A * | 9/1987 | Shimizu | ................ | 358/409 |
| 4,809,061 A * | 2/1989 | Suzuki | ................ | 358/514 |
| 4,875,099 A * | 10/1989 | Sakai et al. | ................ | 358/483 |
| 4,939,578 A * | 7/1990 | Kano | ................ | 358/483 |
| 4,974,072 A * | 11/1990 | Hasegawa | ................ | 358/514 |
| 4,985,760 A * | 1/1991 | Maeshima et al. | ................ | 604/214 |
| 5,003,380 A * | 3/1991 | Hirota | ................ | 358/500 |
| 5,041,859 A * | 8/1991 | Ishiguro et al. | ................ | 396/123 |
| 5,041,995 A * | 8/1991 | Tokuda | ................ | 347/237 |
| 5,070,414 A * | 12/1991 | Tsutsumi | ................ | 358/466 |
| 5,210,612 A * | 5/1993 | Furuta et al. | ................ | 348/262 |
| 5,357,351 A * | 10/1994 | Nakajima et al. | ................ | 358/482 |
| 5,668,597 A * | 9/1997 | Parulski et al. | ................ | 348/350 |
| 5,754,280 A * | 5/1998 | Kato et al. | ................ | 356/3.06 |
| 5,874,994 A * | 2/1999 | Xie et al. | ................ | 348/349 |
| 5,912,746 A * | 6/1999 | Cilke et al. | ................ | 358/482 |
| 6,067,019 A * | 5/2000 | Scott | ................ | 340/573.4 |
| 6,084,740 A * | 7/2000 | Leonhardt et al. | ................ | 360/78.02 |
| 6,115,147 A * | 9/2000 | Mizumoto et al. | ................ | 358/483 |
| 6,211,975 B1 * | 4/2001 | Bryant | ................ | 358/527 |
| 6,236,529 B1 * | 5/2001 | Leonhardt et al. | ................ | 360/77.12 |
| 6,335,805 B1 * | 1/2002 | Ishiguro et al. | ................ | 358/474 |
| 6,441,855 B1 * | 8/2002 | Omata et al. | ................ | 348/356 |

(Continued)

FOREIGN PATENT DOCUMENTS

EP    0274383    1/1988

(Continued)

OTHER PUBLICATIONS

U.K. Search Report dated Aug. 16, 2004 (3 pages).

(Continued)

*Primary Examiner* — Negussie Worku

(57) ABSTRACT

Imaging systems and methods for actuating image sensors based on alignment are disclosed. An example method includes determining by a controller an alignment of a plurality of sensors, the sensors adapted to capture an image of an object. The method also includes actuating the sensors with the controller based on the alignment.

26 Claims, 4 Drawing Sheets

U.S. PATENT DOCUMENTS

| | | | |
|---|---|---|---|
| 6,480,351 B2* | 11/2002 | Leonhardt et al. | 360/77.12 |
| 6,534,757 B2* | 3/2003 | Inui et al. | 250/208.1 |
| 6,549,363 B2* | 4/2003 | Leonhardt et al. | 360/78.02 |
| 6,570,178 B2* | 5/2003 | Yasuda | 250/587 |
| 6,753,986 B1* | 6/2004 | Sato | 358/505 |
| 6,765,691 B2* | 7/2004 | Kubo et al. | 358/1.9 |
| 6,864,474 B2* | 3/2005 | Misawa | 250/201.4 |
| 6,943,829 B2* | 9/2005 | Endo et al. | 348/207.11 |
| 7,016,074 B1* | 3/2006 | Fujita | 358/1.9 |
| 7,027,193 B2* | 4/2006 | Spears et al. | 358/471 |
| 7,289,156 B2* | 10/2007 | Silverbrook et al. | 348/374 |
| 7,433,547 B2* | 10/2008 | Yamamoto | 382/309 |
| 7,471,428 B2* | 12/2008 | Ohara et al. | 358/497 |
| 7,554,577 B2* | 6/2009 | Yokohata et al. | 348/222.1 |
| 7,652,805 B2* | 1/2010 | Oguri et al. | 358/482 |
| 2002/0140998 A1* | 10/2002 | Cardot et al. | 358/505 |
| 2004/0057082 A1* | 3/2004 | Liu | 358/406 |
| 2004/0257451 A1* | 12/2004 | Yamamoto | 348/207.99 |
| 2007/0121169 A1* | 5/2007 | Inukai | 358/3.26 |
| 2008/0024655 A1* | 1/2008 | Maeda | 348/371 |
| 2008/0211941 A1* | 9/2008 | Deever et al. | 348/262 |

FOREIGN PATENT DOCUMENTS

| | | |
|---|---|---|
| EP | 0284043 | 3/1988 |
| EP | 0547599 | 11/1997 |
| JP | 55141862 A | 11/1980 |
| JP | 60-224370 | 11/1985 |
| JP | 1024674 A | 1/1989 |
| JP | 11-284797 | 10/1999 |
| JP | 2001-175001 | 6/2000 |

OTHER PUBLICATIONS

English translation of Japanese Office Action mailed Apr. 25, 2006.

* cited by examiner

*FIG. 3*

| | | | | |
|---|---|---|---|---|
| 60a | LINE 1 | LINE 2 | LINE 3 | LINE 4 |
| 60b | LINE 1 | LINE 2 | LINE 3 | LINE 4 |
| 60c | LINE 1 | LINE 2 | LINE 3 | LINE 4 |
| 60d | LINE 1 | LINE 2 | LINE 3 | LINE 4 |
| 60e | LINE 1 | LINE 2 | LINE 3 | LINE 4 |
| 60f | LINE 1 | LINE 2 | LINE 3 | LINE 4 |
| 60g | LINE 1 | LINE 2 | LINE 3 | LINE 4 |
| 60h | LINE 1 | LINE 2 | LINE 3 | LINE 4 |
| 60i | LINE 1 | LINE 2 | LINE 3 | LINE 4 |
| 60j | LINE 1 | LINE 2 | LINE 3 | LINE 4 |
| 60k | LINE 1 | LINE 2 | LINE 3 | LINE 4 |
| 60l | LINE 1 | LINE 2 | LINE 3 | LINE 4 |
| 60m | LINE 1 | LINE 2 | LINE 3 | LINE 4 |
| 60n | LINE 1 | LINE 2 | LINE 3 | LINE 4 |
| 60o | LINE 1 | LINE 2 | LINE 3 | LINE 4 |
| 60p | LINE 1 | LINE 2 | LINE 3 | LINE 4 |
| 62a | LINE 1 | LINE 2 | LINE 3 | LINE 4 |
| 62b | LINE 1 | LINE 2 | LINE 3 | LINE 4 |
| 62c | LINE 1 | LINE 2 | LINE 3 | LINE 4 |
| 62d | LINE 1 | LINE 2 | LINE 3 | LINE 4 |
| 62e | LINE 1 | LINE 2 | LINE 3 | LINE 4 |
| 62f | LINE 1 | LINE 2 | LINE 3 | LINE 4 |
| 62g | LINE 1 | LINE 2 | LINE 3 | LINE 4 |
| 62h | LINE 1 | LINE 2 | LINE 3 | LINE 4 |
| 62i | LINE 1 | LINE 2 | LINE 3 | LINE 4 |
| 62j | LINE 1 | LINE 2 | LINE 3 | LINE 4 |
| 62k | LINE 1 | LINE 2 | LINE 3 | LINE 4 |
| 62l | LINE 1 | LINE 2 | LINE 3 | LINE 4 |
| 62m | LINE 1 | LINE 2 | LINE 3 | LINE 4 |
| 62n | LINE 1 | LINE 2 | LINE 3 | LINE 4 |
| 62o | LINE 1 | LINE 2 | LINE 3 | LINE 4 |
| 62p | LINE 1 | LINE 2 | LINE 3 | LINE 4 |

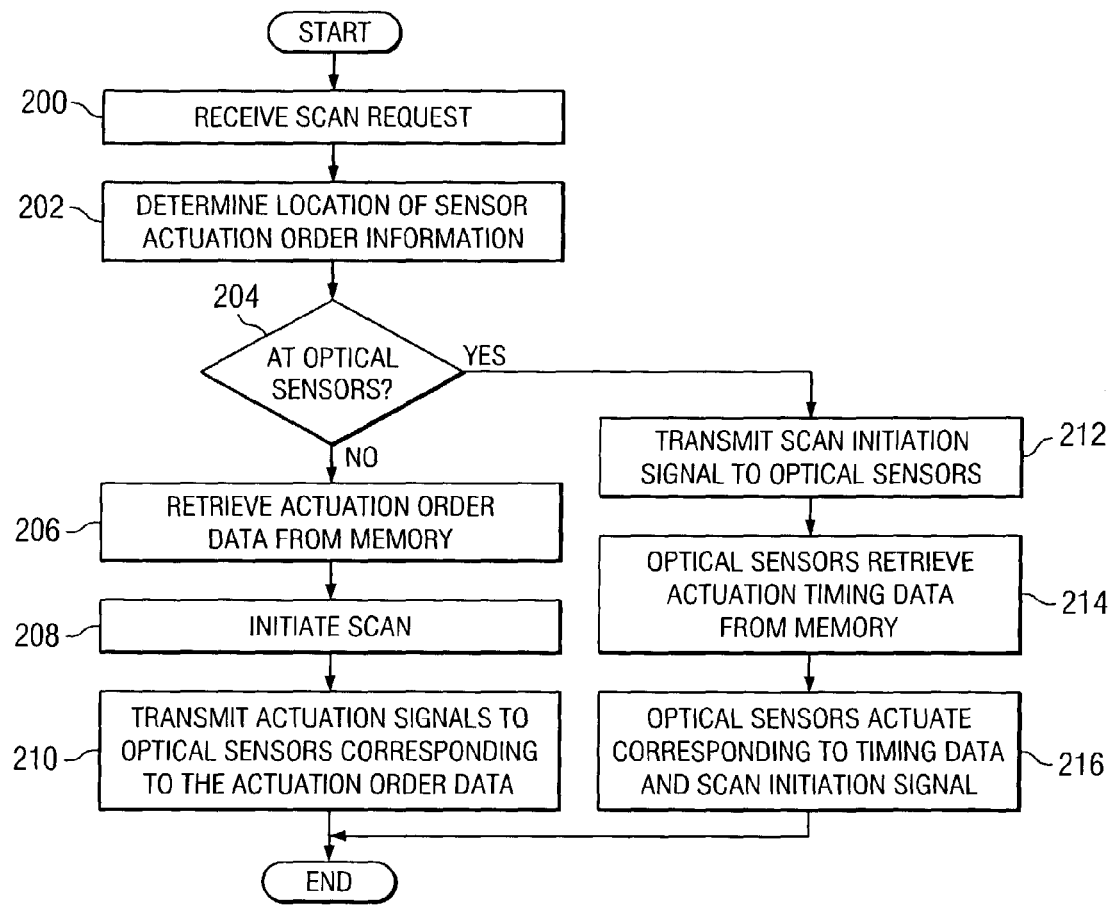

IMAGING SYSTEM AND METHOD

TECHNICAL FIELD OF THE INVENTION

The present invention relates generally to the field of electronic equipment and, more particularly, to an imaging system and method.

BACKGROUND OF THE INVENTION

A variety of types of devices may be used to capture an image of an object such as a scanner, a facsimile machine, and various types of reader devices for reading checks, bar codes, or other types of objects. These devices may use a combination of mirrors, lenses, and illumination sources to illuminate and collect optical information for generating an image of an object. Alternatively, contact image sensors may be used to collect optical information for generating an image of the object. Generally, contact image sensors include an array of optical sensors disposed on a die such as a chip, wafer, or printed circuit board. In operation, light emitting diodes or other types of illumination devices generate light which is captured by the sensors for generating in image of the object.

When using contact image sensors to generate the image of the object, alignment of the die with an imaging area of the device becomes an important issue. For example, misalignment of the die with the viewing area of the device may result in the production of a skewed image which may then require modification to align the image correctly to accommodate copying, printing or other uses. Additionally, to produce an imaging area to accommodate a variety of sizes of objects, multiple contact image sensor dies are often used to create the array of optical sensors. However, when using multiple dies, alignment of the dies and, correspondingly, alignment of the sensors relative to each other, is important. For example, misalignment of the dies and sensors may result in a broken image which may be especially prevalent in higher resolution image generation.

SUMMARY OF THE INVENTION

In accordance with one embodiment of the present invention, an imaging system comprises a plurality of optical sensors adapted to capture an image of an object. The system also comprises a controller adapted to determine an actuation order for the optical sensors based on an alignment of the sensors.

In accordance with another embodiment of the present invention, an imaging method comprises determining an alignment of a plurality of sensors where the sensors are adapted to capture an image of an object. The method also comprises actuating the sensors based on the alignment.

BRIEF DESCRIPTION OF THE DRAWINGS

For a more complete understanding of the present invention and the advantages thereof, reference is now made to the following descriptions taken in connection with the accompanying drawings in which:

FIG. 3 is a diagram illustrating a time-based sensor actuation sequence for the sensor die alignment illustrated in FIG. 2 using an embodiment of an imaging system in accordance with the present invention;

FIG. 5 is a flow chart illustrating an embodiment of another imaging method in accordance with the present invention.

DETAILED DESCRIPTION OF THE DRAWINGS

The preferred embodiments of the present invention and the advantages thereof are best understood by referring to FIGS. 1-5 of the drawings, like numerals being used for like and corresponding parts of the various drawings.

Figure 1:
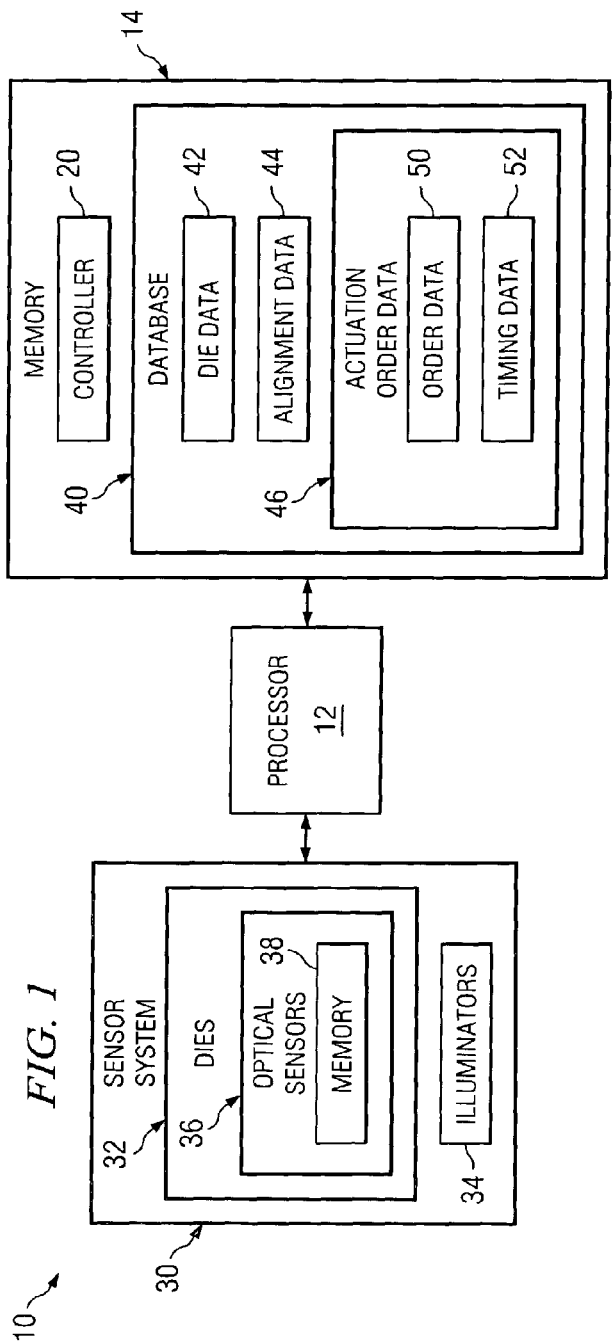
FIG. 1 is a diagram illustrating an embodiment of an imaging system in accordance with the present invention.

FIG. 1 is a diagram illustrating an embodiment of an imaging system 10 in accordance with the present invention. Briefly, system 10 automatically determines and controls the actuation or triggering of optical sensors of an imaging device to compensate for sensor and/or sensor die misalignment. For example, according to one embodiment of the present invention, system 10 automatically determines the positions of the optical sensors relative to each other and automatically determines timing and order information for actuating each of the sensors, thereby reducing or substantially eliminating imaging abnormalities or defects caused by sensor and/or sensor die misalignment.

In the embodiment illustrated in FIG. 1, system 10 comprises a processor 12 coupled to a memory 14. Embodiments of the present invention also encompass computer software that may be stored in memory 14 and executed by processor 12. In the illustrated embodiment, system 10 comprises a controller 20 stored in memory 14. Controller 20 may comprise software, hardware, or a combination of hardware and software. In FIG. 1, controller 20 is illustrated as being stored in memory 14, where it can be executed by processor 12. However, controller 20 may be otherwise stored, even remotely, so as to be accessible by processor 12.

In the embodiment illustrated in FIG. 1, system 10 also comprises a sensor system 30 for capturing an image of an object via an imaging device. Sensor system 30 may be incorporated into any type of imaging device that performs a scanning and/or imaging capturing process such as, but not limited to, a document scanner, a facsimile machine, or a copy machine. In this embodiment, sensor system 30 comprises at least one die 32 and at least one illuminator 34. Illuminator(s) 34 may comprise any type of device for illuminating an object of which an image is to be captured such as, but not limited to, light emitting diodes or other types of light sources.

Die(s) 32 comprise(s) a chip, wafer, printed circuit board, or other type of device having optical sensors 36 for capturing an image of an object. For example, optical sensors 36 may comprise charge-coupled devices (CCDs), complementary metal-oxide semiconductor (CMOS) devices, or other types of sensors for capturing optical information. Additionally, in the embodiment illustrated in FIG. 1, optical sensors 36 may also comprise a non-volatile memory 38 adapted to store information such as, but not limited to, order information, timing information, or other types of information associated with operating functions corresponding to obtaining or capturing an image of an object.

As illustrated in FIG. 1, memory 14 also comprises a database 40 having information associated with obtaining an image of an object. For example, in the illustrated embodiment, database 40 comprises die data 42, alignment data 44, and actuation order data 46. Die data 42 comprises information associated with die(s) 32 of sensor system 30. For example, die data 42 may comprise information associated with a quantity of dies 32 within sensor system 30, positional information relating to dies 32 relative to each other, a quantity of optical sensors 36 disposed on each die 32, or other types of information associated with dies 32. Alignment data 44 comprises information associated with the alignment or position of sensors 36 relative to each other and/or the alignment or position of dies 32 relative to each other. For example, as will be described in greater detail below, system 10 determines an alignment of sensors 36 relative to each other to actuate sensors 36 in a particular timing order to compensate for sensor 36 misalignment. Actuation order data 46 comprises information associated with the actuation timing and order of sensors 36. For example, in the embodiment illustrated in FIG. 1, actuation order data 46 comprises order data 50 and timing data 52. Order data 50 comprises information associated with a particular order of sensor 36 actuation corresponding to alignment data 44. Timing data 52 comprises information associated with timing or time delay between sensor 36 actuation corresponding to alignment data 44.

Briefly, in operation, controller 20 performs a calibration scan using sensor system 30 to determine positional information of sensors 36 and/or dies 32 relative to each other so that sensors 36 may be actuated in a particular order and timing to compensate for misalignment between sensors 36 and/or dies 32. For example, controller 20 performs a calibration scan using sensor system 30 to determine alignment data 44 corresponding to sensors 36 and/or dies 32. Alignment data 44 may be acquired by performing a calibration scan of an object having predetermined or predefined distinct color demarcations or other properties such that the positions of sensors 36 and/or dies 32 may be determined. For example, alignment data 44 may be determined by scanning multiple lines in a particular region of an object having distinct color transitions while triggering simultaneous exposure of all sensors 36 of die(s) 32, thereby generating an actuating pattern for sensors 36. After obtaining alignment data 44, controller 20 may then determine actuation order data 46 for actuating sensors 36 in future scanning operations to compensate for misalignment between sensors 36 and/or dies 32. However, it should also be understood that alignment data 44 corresponding to the position of sensors 36 and/or dies 32 relative to each other may be otherwise determined.

Figure 2:
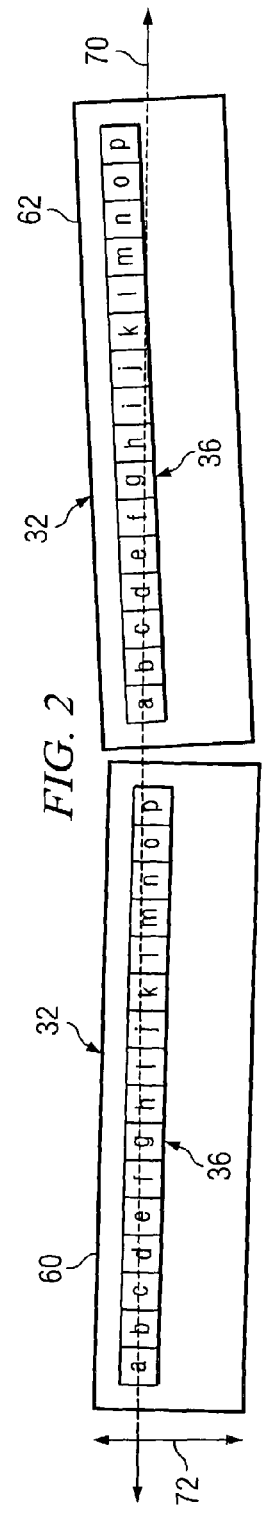
FIG. 2 is a diagram illustrating an example sensor die alignment of a scanning device.

FIG. 2 is a diagram illustrating an example of die 32 alignment of a scanning device. In FIG. 2, two sensor dies 32 are illustrated; however, it should be understood that a greater or fewer quantity of sensor dies 32 may be configured within a particular scanning device. As illustrated in FIG. 2, dies 32 comprise a sensor die 60 and a sensor die 62 each having a plurality of sensors 36 identified in FIG. 2 as a-p. In the embodiment illustrated in FIG. 2, only a single line of optical sensors 36 is illustrated for each of dies 60 and 62; however, it should be understood that additional lines of sensors 36 may be disposed on each sensor die 60 and/or 62.

As illustrated in FIG. 2, dies 60 and 62 are misaligned relative to each other and relative to a set of axes identified generally at 70 and 72. Axes 70 and 72 may represent a scanning area of a scanning device or another reference frame from which the alignment of dies 60 and 62 and, correspondingly, sensors 36 disposed on dies 60 and 62, may be evaluated. As illustrated in FIG. 2, die 60 comprises a negative skew angle relative to axis 70 while sensor die 62 comprises a positive skew angle relative to axis 70. Additionally, as illustrated in FIG. 2, the positions of sensors 36 disposed on each of dies 60 and 62 vary relative to axis 72.

FIG. 3 is a diagram illustrating a time-based actuation of sensors 36 of dies 60 and 62 in accordance with an embodiment of system 10 of the present invention. In FIG. 3, sensor system 30 is illustrated as moving in a direction indicated generally at 80 relative to an object; however, it should be understood that the movement direction may be reversed or the object may move relative to sensor system 30. As described above, the orientation and location of dies 60 and 62 and, correspondingly, sensors 36 of dies 60 and 62, may be determined by scanning multiple lines in a region of an object having distinct color transitions while triggering simultaneous exposure of all sensors 36 of dies 60 and 62, thereby generating an actuating pattern for sensors 36 of dies 60 and 62. For example, from the diagram illustrated in FIG. 2, it would be determined that for a given scan line, sensor 36 identified as "p" of sensor die 62 is exposed first while sensor 36 identified as "p" of sensor die 60 is exposed last. Accordingly, sensor 36 identified as "a" of sensor die 60 is the first sensor 36 exposed on sensor die 60 and sensor 36 identified as "a" on sensor die 62 is the last sensor 36 exposed on sensor die 62. Therefore, from the exposure information generated by the calibration scan, controller 20 determines a sensor 36 actuation timing and order for the scanning device and stores the actuation timing and order information as actuation order data 46.

Additionally, for dies 32 having a generally linear pattern of sensors 36, controller 20 may determine the location of sensors 36 on a particular die 32 by determining a linear alignment of each line of sensors 36 for the particular die 32. For example, controller 20 may be used to determine a location of at least two sensors 36 on a particular die 32 and interpolate a linear line segment extending through the corresponding two sensors 36 to determine an alignment of the remaining sensors 36 on the particular die 32. The selected sensors 36 for determining linear alignment are preferably located near each end of a particular die 32; however, it should be understood that other sensors 36 for a particular die 32 may be used to determine the linear alignment of sensors 36 relative to each other for the particular die 32.

For linear arrangements of sensors 36, it should also be noted that the exposure or actuation pattern is linear for the particular die 32 such that for any given sensor 36 on the particular die 32 that has finished actuating, the next sensor 36 to actuate is immediately adjacent. As illustrated in FIGS. 2 and 3, the exposure timing on sensor die 60 illustrates that sensor 36 identified as "p" of sensor die 60 finishes exposure one-third of an exposure cycle later than sensor 36 identified as "a" on sensor die 60 to compensate for an approximate one-third sensor 36 location error.

As described above, controller 20 may also automatically determine a quantity of dies 32 of system 30 and identify which sensors 36 reside on which dies 32. For example, die data 42 may comprise information associated with a quantity and position of dies 32 of system 30 and/or a quantity of sensors 36 residing on each die 32 such that controller 20 may access die data 42 to determine the quantity of dies 32 of system 30 and/or the quantity of sensors 36 residing on each die 32. Alternatively, controller 20 may also determine the quantity and location of dies 32 and sensors 36 by analyzing information obtained during a calibration scan. For example, as described above, sensors 36 are generally disposed on die(s) 32 in a linear arrangement. Thus, controller 20 may perform a calibration scan and determine linear patterns for sensors 36 of system 30. Controller 30 may then analyze the linear patterns to determine a quantity of dies 32 of system 30 by associating each linear arrangement of sensors 36 to a particular die 32. Further, after associating linear patterns to corresponding dies 32, controller 20 may then identify which sensors 36 reside on which dies 32. However, it should be understood that other methods may also be used to determine a quantity of dies 32 and/or sensors 36 of system 30.

Thus, system 10 automatically determines the alignment of sensors 36 for a particular scanning device and automatically compensates for any sensor 36 misalignment in the scanning device by determining an actuation order for sensors 36 of the scanning device. System 10 may be used to control actuation of sensors 36 on a single die 32 or correlate actuating orders for sensors 36 disposed on a plurality of dies 32. Additionally, system 10 may be configured to store the actuation information in database 40 or directly to memory 38 of sensors 36. For example, in one embodiment, system 10 may be configured such that in response to each scanning request, controller 20 retrieves actuation order data 46 and controls actuation of each of sensors 36 of sensor system 30 to compensate for detected misalignment. In another embodiment, system 10 may be configured such that the actuation order and timing information is stored directly to memories 38 of sensors 36. For example, in this embodiment, controller 20 may transmit a scan initiation signal to each of optical sensors 36. The information stored in memory 38 may indicate to each sensor 36 of a particular die 32 a timing pattern or time delay period for actuation in response to the receipt of the scan initiation signal such that each sensor 36 for each die 32 of the scanning device triggers or actuates according to a predetermined order and timing pattern.

Figure 4:
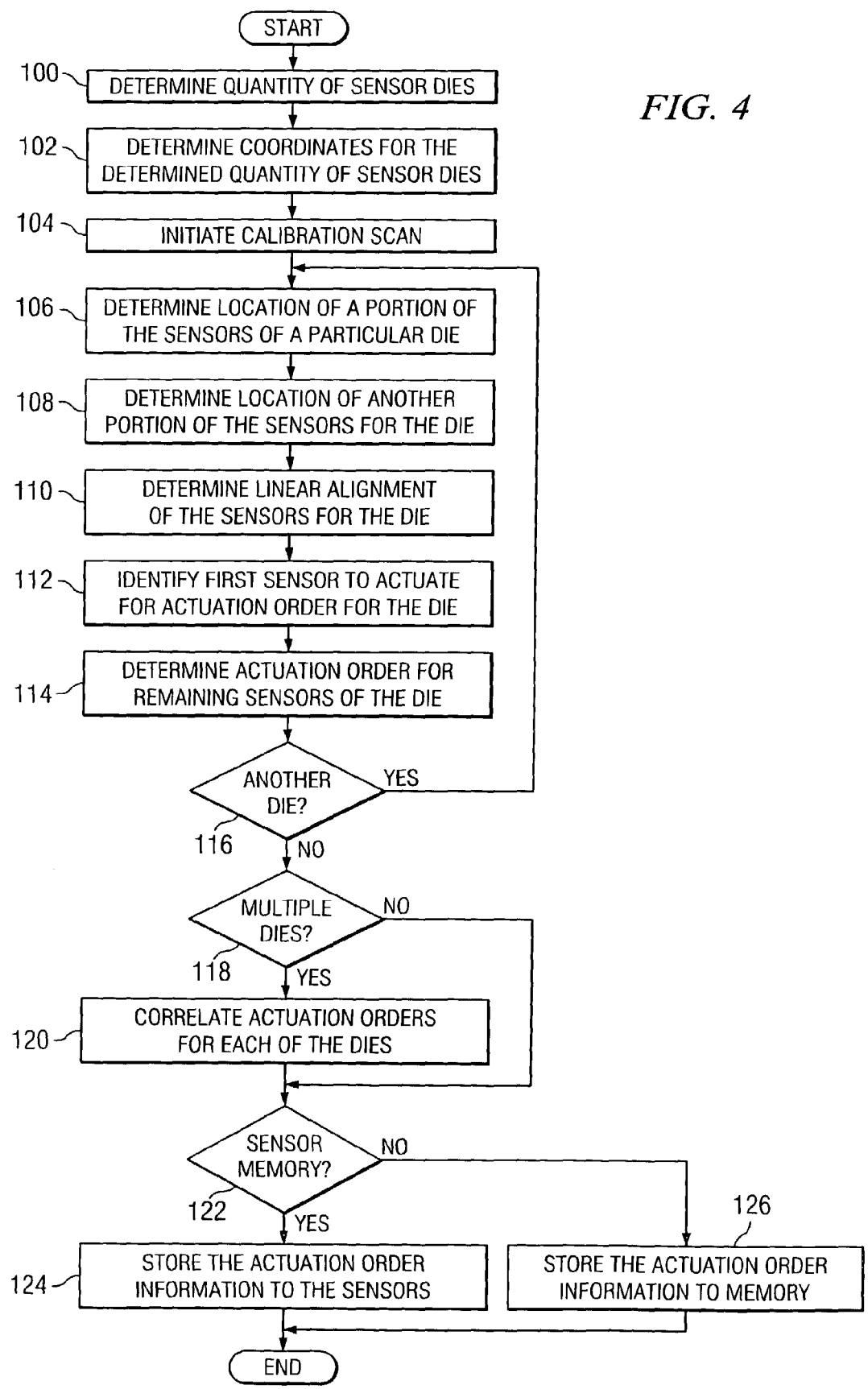
FIG. 4 is a flow chart illustrating an embodiment of an imaging method in accordance with the present invention.

FIG. 4 is a flowchart illustrating an embodiment of an imaging method in accordance with the present invention. The method begins at block 100, where controller 20 determines a quantity of sensor dies 32 for a particular scanning device. At block 102, controller 20 determines the coordinates for the determined quantity of sensor dies 32 for the scanning device. For example, as described above, controller 20 may access die data 42 to determine the quantity and/or positional information corresponding to dies 32 for the particular scanning device. At block 104, controller 20 initiates a calibration scan.

At block 106, controller 20 determines a location of a portion of sensors 36 for a particular die 32. At block 108, controller 20 determines a location of another portion of sensors 36 for the selected die 32. For example, as described above, controller 20 may select two sensors 36 each located at an opposite end of a sensor 36 line of a particular die 32, controller 20 may select two or more groups of sensors 36 disposed at different locations along a sensor 36 line of a particular die 32, or controller 20 may otherwise select at least two sensors 36 of a particular die 32 for generating a linear analysis of the particular sensor 36 line. At block 110, controller uses the information obtained in blocks 106 and 108 to determine the linear alignment of sensors 36 for the selected die 32. At block 112, controller 20 identifies the first sensor 36 to actuate for a particular actuation order for the selected die 32. At block 114, controller 20 determines an actuation order and timing pattern for the remaining sensors 36 for the particular die 32.

At decisional block 116, a determination is made whether the scanning device comprises another die 32. If the scanning device comprises another die 32, the method returns to block 106 and an actuation order and timing pattern is determined for another die 32. If the scanning device does not contain another die 32, the method proceeds to decisional block 118, where a determination is made whether the scanning device comprises multiple dies 32. If the scanning device comprises multiple dies 32, the method proceeds to block 120, where controller 20 correlates the actuation orders for each of the dies 32. If the scanning device does not comprise multiple dies 32, the method proceeds from block 118 to decisional block 122, where a determination is made whether sensors 36 comprise memory 38 for storing the actuation order and timing information. If sensors 36 comprise memory 38 for storing actuation information, the method proceeds to block 124, where controller 20 stores the actuation order and timing information to memories 38 of sensors 36. If sensors 36 do not comprise memory 38 for storing the actuation information, the method proceeds to block 126, where controller 20 stores the actuation order and timing information in memory 14, e.g., database 40.

FIG. 5 is a flowchart illustrating another embodiment of an imaging method in accordance with the present invention. The method begins at block 200, where system 10 receives a scanning request. At block 202, controller 20 determines a location of stored sensor 36 actuation order and timing information. At decisional block 204, controller 20 determines whether the actuation order and timing information is stored at optical sensors 36. If the actuation order and timing information is not stored at optical sensors 36, the method proceeds from block 204 to block 206, where controller 20 retrieves actuation order data 46 from database 40. At block 208, controller 20 initiates the requested scan. At block 210, controller 20 transmits actuation signals to optical sensors 36 of each die 32 of the scanning device corresponding to actuation order data 46.

If controller 20 determines that the actuation order and timing information is stored at optical sensors 36 at block 204, the method proceeds from block 204 to block 212, where controller 20 transmits a scan initiation signal to optical sensors 36 of each of dies 32. At block 214, each of optical sensors 36 retrieves the actuation order an timing information from memories 38 such as order data 50 and/or timing data 52 for determining when to actuate in response to the scan initiation signal. At block 216, optical sensors 36 actuate corresponding to timing data 52 stored in memory 38 and the scan initiation signal.

It should be understood that in the described methods, certain functions may be omitted, combined, or accomplished in a sequence different than that depicted in FIGS. 4 and 5. Also, it should be understood that the methods depicted may be altered to encompass any of the other features or aspects of the invention as described elsewhere in the specification.

What is claimed is:

1. An imaging system, comprising:
    a plurality of optical sensors to capture an image of an object; and
    a controller to determine an actuation order for the optical sensors based on an alignment of the sensors.

2. The system of claim 1, wherein the controller actuates the sensors based on a position of the sensors relative to each other.

3. The system of claim 1, wherein the controller determines a location of each of the sensors relative to each other.

4. The system of claim 1, wherein at least two of the plurality of sensors reside on different dies.

5. The system of claim 1, wherein the controller determines a linear alignment of the sensors from at least two of the sensors.

6. The system of claim 1, wherein the controller determines a time interval for actuating each of the sensors.

7. The system of claim 1, wherein the controller stores data corresponding to the alignment of the sensors to a non-volatile memory.

8. The system of claim 1, wherein the controller stores data corresponding to the alignment of the sensors to the sensors.

9. The system of claim 1, wherein the imaging system is disposed on a device consisting of at least one of the following:
- a scanner;
- a facsimile machine; and
- a copy machine.

10. The system of claim 1, wherein the controller initiates a calibration scan to determine the alignment of the sensors.

11. A method for actuating image sensors based on alignment, comprising:
- determining by a controller an alignment of a plurality of sensors, the sensors adapted to capture an image of an object; and
- actuating the sensors with the controller based on the alignment.

12. The method of claim 11, further comprising the controller determining a linear alignment of the sensors.

13. The method of claim 11, wherein determining the alignment comprises performing a calibration scan to determine the alignment of the sensors.

14. The method of claim 11, further comprising the controller determining whether at least two of the sensors reside on different dies.

15. The method of claim 11, further comprising storing information associated with the alignment to a non-volatile memory.

16. The method of claim 11, further comprising storing information associated with the alignment to the sensors.

17. The method of claim 11, further comprising storing, to the sensors, information associated with an actuation sequence of the sensors based on the alignment.

18. The method of claim 11, wherein determining the alignment comprises determining a position of each of the sensors relative to each other.

19. The method of claim 11, further comprising determining the controller a time interval for actuating each of the sensors based on the alignment.

20. An imaging system, comprising:
- a plurality of means for optically capturing an image of an object; and
- means for actuating the plurality of image capturing means based on an alignment of the image capturing means.

21. The system of claim 20, wherein the means for actuating comprises means for storing information associated with the alignment to a non-volatile memory.

22. The system of claim 20, wherein the means for actuating comprises means for storing information associated with the alignment to the plurality of image capturing means.

23. The system of claim 20, wherein the means for actuating comprises means for determining a linear alignment of the plurality of image capturing means.

24. The system of claim 20, wherein the means for actuating comprises means for determining a time interval for actuating the plurality of image capturing means.

25. The system of claim 20, wherein the means for actuating comprises means for determining whether at least two of the plurality of image capturing means reside on different dies.

26. The system of claim 20, wherein the means for actuating comprises means for determining a location of each of the plurality of image capturing means relative to each other.

* * * * *